(12) United States Patent
Hashem et al.

(10) Patent No.: US 7,155,578 B2
(45) Date of Patent: Dec. 26, 2006

(54) METHOD AND SYSTEM FOR TRANSFERRING FILES USING FILE TRANSFER PROTOCOL

(75) Inventors: Tony Hashem, Lynchburg, VA (US); Keri Quinn, Branford, CT (US); Ashwin Parmar, Lynchburg, VA (US)

(73) Assignee: Genworth Financial, Inc., Richmond, VA (US)

( * ) Notice: Subject to any disclaimer, the term of this patent is extended or adjusted under 35 U.S.C. 154(b) by 405 days.

(21) Appl. No.: 10/116,056

(22) Filed: Apr. 5, 2002

(65) Prior Publication Data

US 2003/0191811 A1 Oct. 9, 2003

(51) Int. Cl.
G06F 13/00 (2006.01)
G06F 15/167 (2006.01)
G06F 12/00 (2006.01)

(52) U.S. Cl. ............... 711/147; 711/154; 709/216; 709/230; 707/200

(58) Field of Classification Search ............ 707/1, 707/10, 200; 709/213, 216; 711/100, 147, 711/154; 109/213
See application file for complete search history.

(56) References Cited

U.S. PATENT DOCUMENTS

| | | | |
|---|---|---|---|
| 4,200,770 A | 4/1980 | Hellman et al. | |
| 4,218,582 A | 8/1980 | Hellman et al. | |
| 4,405,829 A | 9/1983 | Rivest et al. | |
| 4,424,414 A | 1/1984 | Hellman et al. | |
| 5,053,945 A * | 10/1991 | Whisler ............... | 707/200 |
| 5,214,703 A | 5/1993 | Massey et al. | |
| 5,235,702 A | 8/1993 | Miller | |
| 5,343,480 A * | 8/1994 | Hasegawa ............... | 714/750 |
| 5,473,691 A | 12/1995 | Menezes et al. | |
| 5,553,083 A | 9/1996 | Miller | |
| 5,586,313 A | 12/1996 | Schnittker et al. | |
| 5,701,484 A | 12/1997 | Artsy | |
| 5,751,970 A | 5/1998 | Bournas | |
| 5,805,810 A | 9/1998 | Maxwell | |
| 5,841,873 A | 11/1998 | Lockhart et al. | |
| 5,903,723 A | 5/1999 | Beck et al. | |
| 5,907,848 A | 5/1999 | Zaiken et al. | |
| 5,995,939 A | 11/1999 | Berman et al. | |
| 6,023,506 A | 2/2000 | Ote et al. | |
| 6,073,142 A | 6/2000 | Geiger et al. | |
| 6,085,251 A * | 7/2000 | Fabozzi, II ............... | 709/230 |

(Continued)

FOREIGN PATENT DOCUMENTS

WO   WO 99/00958 A   1/1999

OTHER PUBLICATIONS

U.S. Appl. No. 09/824,052, filed Apr. 3, 2001.

(Continued)

*Primary Examiner*—Tuan V. Thai
(74) *Attorney, Agent, or Firm*—Hunton & Williams

(57) ABSTRACT

The method and system of the invention provides a technique for transferring files from a first location to a second location using the File Transfer Protocol (FTP). That is, the invention provides a method of transferring files using FTP from a first memory associated with a first processing portion to a second processing portion, the method comprising placing a file in the first memory; determining the destination of the file based on configuration parameters associated with the first memory, the destination of the file being the second processing portion; and attempting to establish a connection between the first processing portion and the second processing portion in order to transfer the file from the first memory to the second processing portion.

23 Claims, 8 Drawing Sheets

U.S. PATENT DOCUMENTS

| | | |
|---|---|---|
| 6,092,101 A | 7/2000 | Birrell et al. |
| 6,092,198 A * | 7/2000 | Lanzy et al. ............... 713/201 |
| 6,098,180 A | 8/2000 | Kobata et al. |
| 6,161,181 A | 12/2000 | Haynes, III et al. |
| 6,192,407 B1 | 2/2001 | Smith et al. |
| 6,192,412 B1 * | 2/2001 | Cantoral et al. ............ 709/236 |
| 6,246,991 B1 | 6/2001 | Abe et al. |
| 6,249,866 B1 | 6/2001 | Brundrett et al. |
| 6,272,485 B1 | 8/2001 | Sragner |
| 6,282,565 B1 | 8/2001 | Shaw et al. |
| 6,292,790 B1 * | 9/2001 | Krahn et al. ................. 705/50 |
| 6,327,611 B1 | 12/2001 | Everingham |
| 6,370,567 B1 | 4/2002 | Ouchi |
| 6,385,595 B1 | 5/2002 | Kolling et al. |
| 6,385,644 B1 | 5/2002 | Devine et al. |
| 6,401,239 B1 * | 6/2002 | Miron ....................... 707/203 |
| 6,460,087 B1 * | 10/2002 | Saito et al. ................ 709/236 |
| 6,539,404 B1 | 3/2003 | Ouchi |
| 6,574,634 B1 | 6/2003 | Woehl |
| 6,615,383 B1 | 9/2003 | Talluri et al. |
| 6,725,220 B1 | 4/2004 | Stratigos et al. |
| 6,792,544 B1 | 9/2004 | Hashem et al. |
| 6,826,539 B1 | 11/2004 | Loveland |
| 6,826,542 B1 | 11/2004 | Virgin et al. |
| 6,922,720 B1 | 7/2005 | Cianciarulo et al. |
| 7,013,298 B1 | 3/2006 | De La Huerga |
| 2001/0018702 A1 * | 8/2001 | Baumeister et al. ........ 709/203 |
| 2001/0037464 A1 | 11/2001 | Persels et al. |
| 2002/0026481 A1 * | 2/2002 | Mori et al. ................. 709/206 |
| 2002/0046250 A1 | 4/2002 | Nassiri |
| 2002/0099798 A1 | 7/2002 | Fedorovsky et al. |
| 2002/0104022 A1 * | 8/2002 | Jorgenson .................. 713/201 |
| 2002/0108034 A1 | 8/2002 | Hashem |
| 2002/0111834 A1 | 8/2002 | Kogure |
| 2002/0174220 A1 * | 11/2002 | Johnson ..................... 709/224 |
| 2002/0184224 A1 | 12/2002 | Haff et al. |
| 2003/0084123 A1 * | 5/2003 | Kamel ....................... 709/219 |
| 2003/0088443 A1 | 5/2003 | Majikes |
| 2003/0088668 A1 | 5/2003 | Mori et al. |
| 2005/0080649 A1 | 4/2005 | Alvarez |
| 2005/0182666 A1 | 8/2005 | Perry |
| 2005/0182667 A1 | 8/2005 | Metzger |

OTHER PUBLICATIONS

U.S. Appl. No. 09/760,296, filed Jan. 16, 2001.
U.S. Appl. No. 10/309,084, filed Dec. 4, 2002.

* cited by examiner

Network Arrangement 2

__US 7,155,578 B2__

METHOD AND SYSTEM FOR TRANSFERRING FILES USING FILE TRANSFER PROTOCOL

BACKGROUND OF THE INVENTION

The method and system of the invention relate to the transfer of files using the File Transfer Protocol (FTP).

FTP is a primary technology by which files are transferred on the Internet. Also, FTP is one of the oldest and most popular methods of sending files across the Internet. FTP is particularly useful when it is necessary to make a large amount of files available to remote users. A wide variety of files may be sent using FTP. For example, files that can be FTP'd include image files, sounds, motion pictures, text, and computer software.

However, a problem exists with known techniques to prepare and forward files using FTP. Often times, the amount of manual manipulation required by a user to FTP files is substantial. In this age when all users request expediency, these manual steps can be burdensome. Further, with less experienced users, the required manual steps needed to FTP files may in fact preclude the use of FTP.

The method and system of the invention address the above, as well as other problems and shortcomings of the known techniques.

BRIEF SUMMARY OF THE INVENTION

The method and system of the invention provides a technique for transferring files from a first location to a second location using the File Transfer Protocol (FTP). That is, the invention provides a method of transferring files using FTP from a first memory associated with a first processing portion to a second processing portion, the method comprising placing a file in the first memory; determining the destination of the file based on configuration parameters associated with the first memory, the destination of the file being the second processing portion; and attempting to establish a connection between the first processing portion and the second processing portion in order to transfer the file from the first memory to the second processing portion.

In a further aspect, the invention provides a processing portion for transferring files to a destination using file transfer protocol (FTP), the processing portion comprising a network interface portion for controlling transfer of files in the processing portion; an internal outbasket portion containing a plurality of internal outbaskets, at least one of the plurality of internal outbaskets containing a file; a memory portion, the memory portion including a configuration parameters file containing configuration parameters; and wherein the network interface portion identifies the file in the at least one of the plurality of internal outbaskets, the network interface portion determining the destination of the file based on the configuration parameters and the internal outbasket in which the file was found.

In a further aspect, the invention provides a method of transferring files using file transfer protocol (FTP) from a first memory associated with a first processing portion to a second memory in a second processing portion, the method comprising placing a file in the first memory; determining the destination of the file based on configuration parameters associated with the first memory, the destination of the file being the second memory, the configuration parameters being retrieved from a configuration parameters file in the first processing portion; and attempting to establish a connection between the first processing portion and the second processing portion in order to transfer the file from the first memory to the second memory; wherein the first memory being an internal outbasket disposed in a home FTP processing portion and the second memory being an external in basket disposed in a remote entity FTP processing portion; the method further including the steps of determining that the connection between the first processing portion and the second processing portion is successful; retrieving the file from the first memory; and transferring the file to the second memory in the second processing portion.

In a further aspect, the invention provides a processing portion for transferring files to a destination using file transfer protocol (FTP), the processing portion comprising a network interface portion for controlling transfer of files in the processing portion; an internal outbasket portion containing a plurality of internal outbaskets, at least one of the plurality of internal outbaskets containing a file; a memory portion, the memory portion including a configuration parameters file containing configuration parameters; an internal inbasket portion containing a plurality of internal inbaskets, each internal inbasket being associated with a corresponding remote external outbasket, the association between each internal inbasket and the corresponding remote external outbasket being obtained from the configuration parameters file by the network interface portion; and an event log, the event log storing status information of files transferred by the processing portion; wherein the network interface portion identifies the file in the at least one of the plurality of internal outbaskets, the network interface portion determining the destination of the file based on the configuration parameters and the internal outbasket in which the file was found; and wherein the network interface portion attempts to establish a connection between the processing portion and the destination, the network interface portion monitoring success of the connection, the network interface portion outputting a message to a user, the message regarding at least one of the success of the connection and transfer of the file.

BRIEF DESCRIPTION OF THE DRAWINGS

The present invention can be more fully understood by reading the following detailed description together with the accompanying drawings, in which like reference indicators are used to designate like elements, and in which.

DETAILED DESCRIPTION OF THE INVENTION

Hereinafter, aspects of the system and method of the invention in accordance with various embodiments will be described. As used herein, any term in the singular may be interpreted to be in the plural, and alternatively, any term in the plural may be interpreted to be in the singular.

The system and method of the invention are directed to the above stated problems, as well as other problems, that are present in conventional techniques. The foregoing description of various products, methods, or apparatus and their attendant disadvantages described in the "Background of the Invention" is in no way intended to limit the scope of the invention, or to imply that the invention does not include some or all of various elements of known products, methods, and/or apparatus in one form or another. Indeed, various embodiments of the invention may be capable of overcoming some of the disadvantages noted in the "Background of the Invention," while still retaining some or all of the various elements of known products, methods, and apparatus in one form or another.

The system and method of the invention allow a user, company or other entity, for example, to transmit (FTP) files to and from multiple sources and destinations over the Internet or another network. In particular, the invention allows the placement of a file in a basket, i.e., in an internal outbasket, to determine the destination that the file will be sent. In accordance with one embodiment of the invention, users will be notified via e-mail of a failed transmission. The process of the invention records successful and failed transmissions into a log file, which may be later imported into a database. The system and method of the invention may be utilized in any process that requires an FTP service. The invention offers the benefit of tracking and maintaining all outgoing and incoming files.

The system and method of the invention offer a variety of features. The invention involves limited manual intervention of the FTP process while tracking transactions. Further, the invention provides configurable processing, that allows successful FTP uploads or downloads with any site that is specified. A user is able to ensure that files were properly sent and/or received at the specified location. If a file was not successfully transferred, the user will be notified via email, for example. If a user needs information on files sent and/or received in the past, the user can refer to the database for a historical log.

Figure 1:
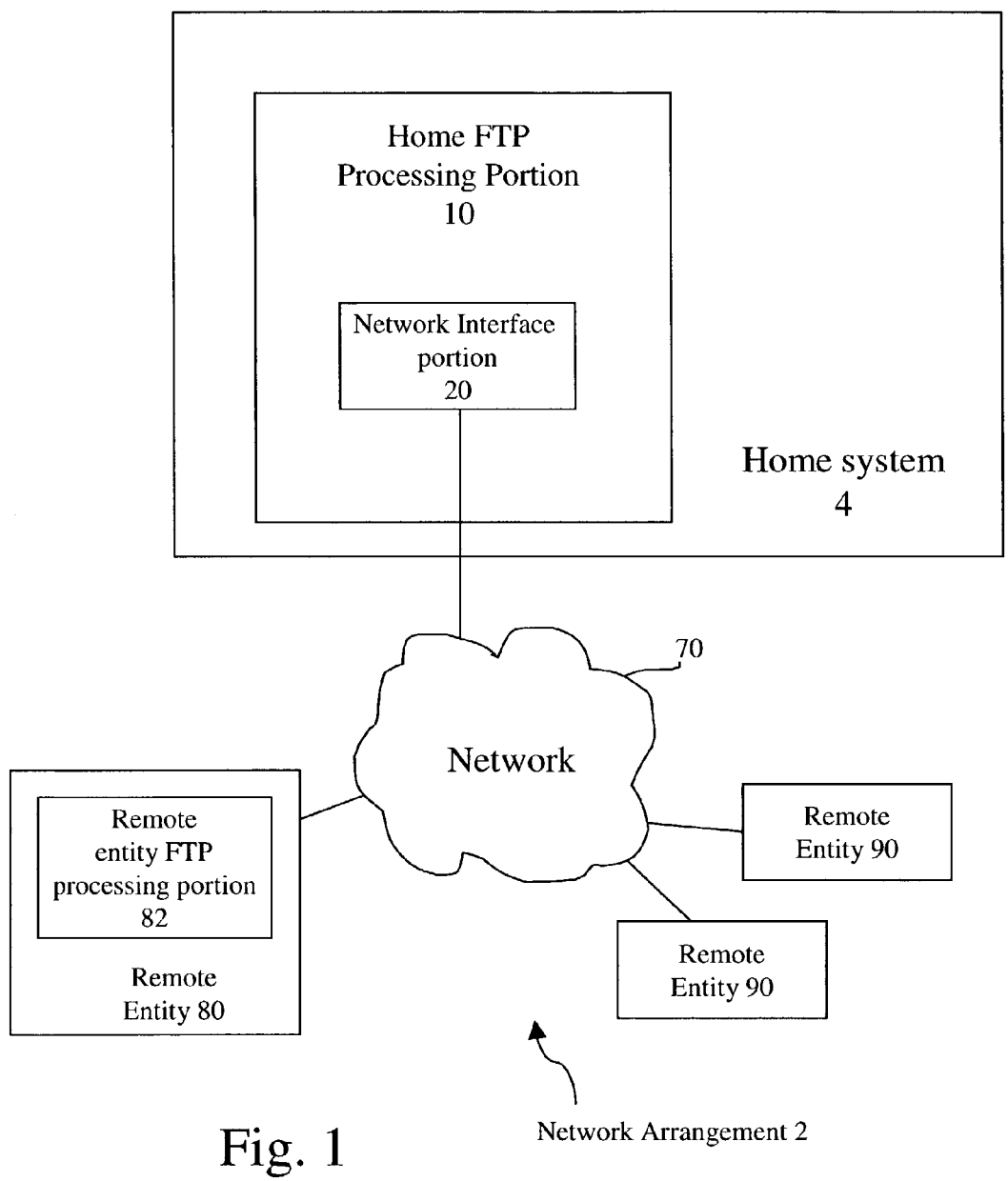
FIG. 1 is a block diagram showing a network arrangement including a home FTP processing portion in accordance with one embodiment of the invention.

FIG. 1 is a block diagram showing a network arrangement 2 that includes a home FTP processing portion 10, in accordance with one embodiment of the invention. As shown in FIG. 1, the network arrangement 2 includes a network 70. The network 70 provides communication between a home system 4 and a plurality of remote entities (80, 90). Files are transferred over the network 70 using FTP in accordance with embodiments of the invention. The network 70 may utilize any of a variety of technologies including the Internet or a LAN, for example.

The home system 4 includes the home FTP processing portion 10. In turn, the home FTP processing portion 10 includes a network interface portion 20. The network interface portion 20 functions to interface the home FTP processing portion 10 with the network 70. It is appreciated that the remote entities (80,90) may possess a similar architecture as the home FTP processing portion 10, as is further described below. Accordingly, as shown in FIG. 1, the destination entity 80 includes a remote entity FTP processing portion 82.

Figure 2:
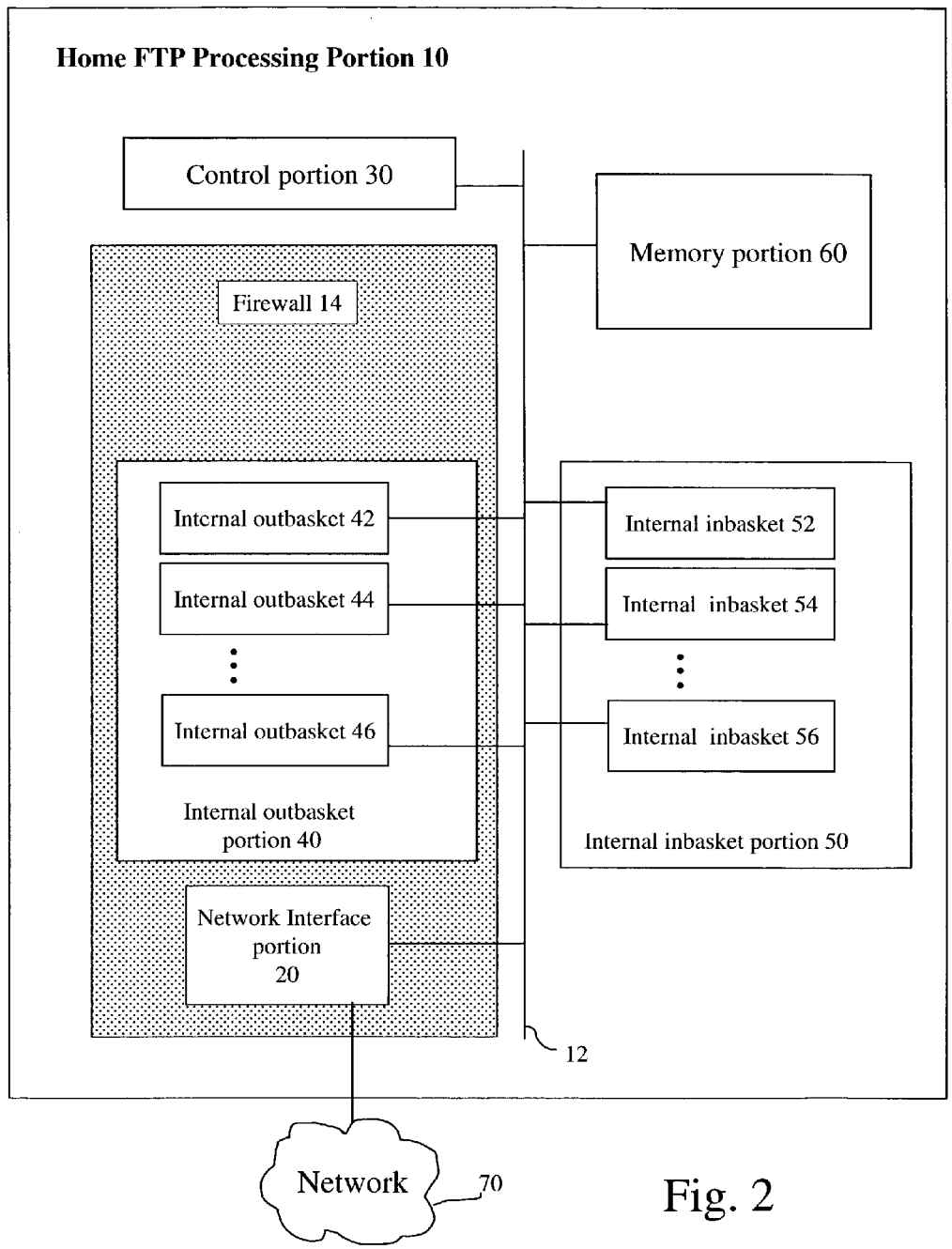
FIG. 2 is a block diagram showing further details of the home FTP processing portion of FIG. 1 in accordance with one embodiment of the invention.

FIG. 2 is a block diagram showing in further detail the home FTP processing portion 10 in accordance with one embodiment of the invention. As shown in FIG. 2, the processing portion 10 includes a control portion 30, the network interface portion 20, and a memory portion 60. The control portion 30 controls overall operations of the processing portion 10. Further, the network interface portion 20 provides communication between the processing portion 10 and the network 70, as discussed above. The memory portion 60 is described in further detail below with reference to FIG. 3.

The processing portion 10 also includes an internal outbasket portion 40 and an internal inbasket portion 50. The internal outbasket portion 40 contains multiple internal outbaskets (42, 44, 46) that may contain files for uploading, as described in further detail below. Further, the internal inbasket portion 50 contains multiple internal inbaskets (52, 54, 56), which may contain files that have been downloaded, in accordance with the process of the invention, as is also described below.

As shown in FIG. 2, the processing portion 10 may utilize a fire wall 14. Accordingly, both the internal outbasket portion 40 and the network interface portion 20 may be separated from the other processing and storage components of the processing portion 10 for security purposes. However, it is appreciated that any of a wide variety of fire wall arrangements might be utilized, and the system and method of the invention are not limited to the fire wall arrangement as shown in FIG. 2. Further, it may be the situation that a fire wall arrangement is not necessary at all.

As shown in FIG. 2, the processing portion 10 also includes an interface 12. The interface 12 connects the various components of the processing portion 10. The interface 12 may be any of a wide variety of arrangements, including a bus or other common pathway or channel, for example. Further, communications across the interface 12 to the internal outbasket portion 40 or the network interface portion 20, i.e., across the firewall, may utilize appropriate security technologies, as is known in the art.

Figure 3:
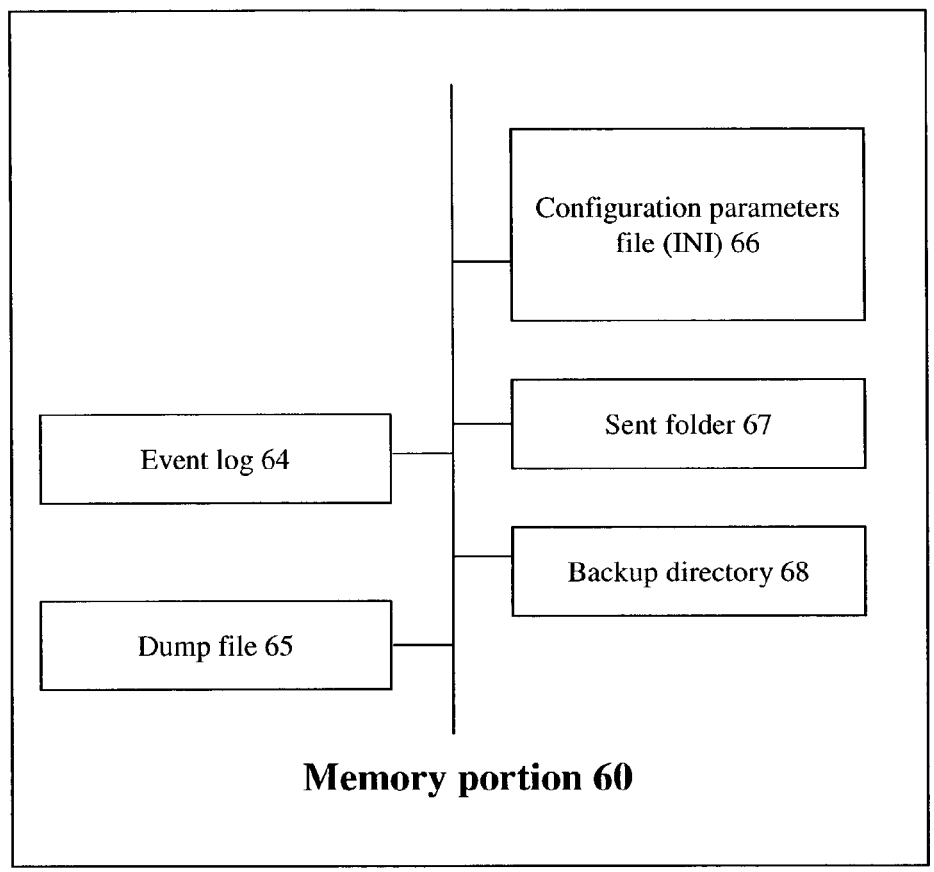
FIG. 3 is a block diagram showing further details of the memory portion of FIG. 2 in accordance with one embodiment of the invention.

FIG. 3 is a block diagram showing the memory portion 60 of FIG. 2 in further detail. As shown in FIG. 3, the memory portion 60 includes an event log 64, a dump file 65, a configuration parameters file 66, a sent folder 67, and a backup directory 68. The event log 64 and the dump file 65 retain information regarding the processing performed by the FTP processing portion 10. The configuration parameters file 66 contains various information regarding the parameters under which the FTP processing portion 10 operates. Further, the sent folder 67 and the backup directory 68 contains file information and files that have been transferred by the FTP processing portion 10.

Figure 4:
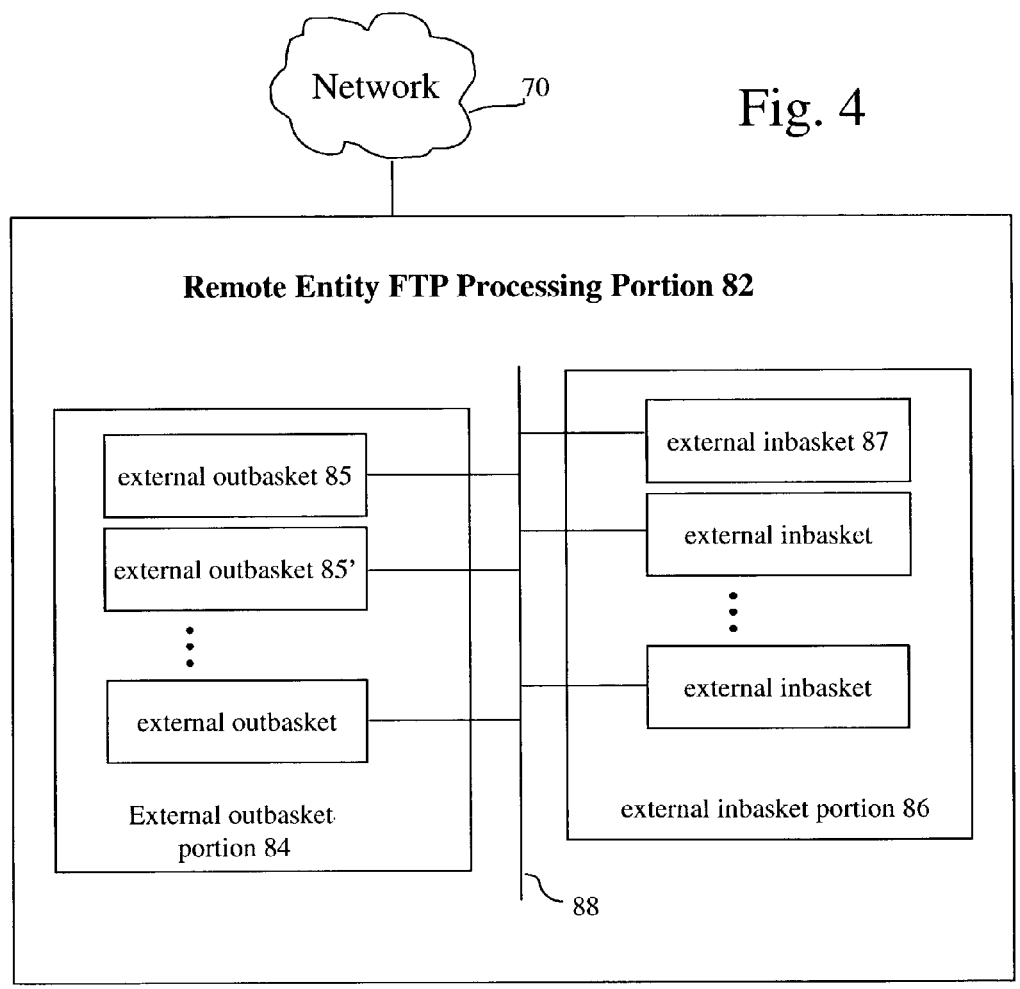
FIG. 4 is a block diagram showing further details of the "remote entity FTP processing portion" of FIG. 1 in accordance with one embodiment of the invention.

FIG. 4 is a diagram showing further details of the remote entity 80 and specifically, the remote entity FTP processing portion 82. As shown in FIG. 4, the remote entity FTP processing portion 82 possesses a similar architecture as that of the FTP processing portion 10. That is, the remote entity FTP processing portion 82 includes an external outbasket portion 84 and an external inbasket portion 86. Such baskets are herein designated as "external" since they are outside the home system 4 and outside the FTP processing portion 10. An interface 88 connects the various components of the remote entity FTP processing portion 82.

In accordance with this illustrative embodiment of the invention, the remote entity FTP processing portion 82 may also include a network interface portion, a control portion and a memory portion. These components may operate in a manner similar to the corresponding components in the FTP processing portion 10, described above. However, such further details of the remote entity FTP processing portion 82 are not shown in FIG. 4.

As shown in FIG. 4, the external outbasket portion 84 and the external inbasket portion 86, in the remote entity FTP processing portion 82, each contain a plurality of baskets. That is, the external outbasket portion 84 includes a plurality of external outbaskets, including the external outbasket 85 and the external outbasket 85. Further, the external inbasket portion 86 includes a plurality of external inbaskets, including the external inbasket 87. Further details of the operation of the baskets in the remote entity FTP processing portion 82 in conjunction with the baskets in the FTP processing portion 10 are described below.

The FTP processing portion 10 provides two major functions. These functions include uploading and downloading files over the Internet 70, in accordance with the illustrative embodiment of the invention shown in FIGS. 1–3. Hereinafter, aspects of uploading files will be described in accordance with one embodiment of the invention.

A user interfacing with the home system 4, as shown in FIG. 1, uploads files when the user needs to send a file from their location to another location. The user configures the system of the invention, and indicates the locations from which files will be uploaded. At specified times or after a definite time interval (depending on the configuration), the system will automatically look into all of the different directories, i.e., "internal outbaskets," within the user's location for files that need to be uploaded to an FTP site outside of the user's location, i.e., outside of the home system 4, for example. There will be multiple outbaskets and each corresponds to a single destination external to the user's location. When a file or files are found in an outbasket, the application will determine the corresponding destination and try to establish a connection to that destination.

The connection to the remote destination may fail for some reason. If the connection to the destination fails, the application will retry after a "n" interval of time, for a "n" number of times. Between intervals the application will look for the next directory, i.e., the next outbasket. If a connection is not established, after 'n' attempts, the application will send a notification e-mail to the respective users and any other persons as desired. If connected, the system will upload the files to the specified location, i.e., an "inbasket" in an external directory at the destination. A successful upload will be recorded to a log file. In the event of an unsuccessful upload an error e-mail alert will be sent to the user. The files will then be removed from the directory/outbasket and placed in a designated "sent folder." An e-mail might also be sent subsequent to a successful upload.

Figure 5:
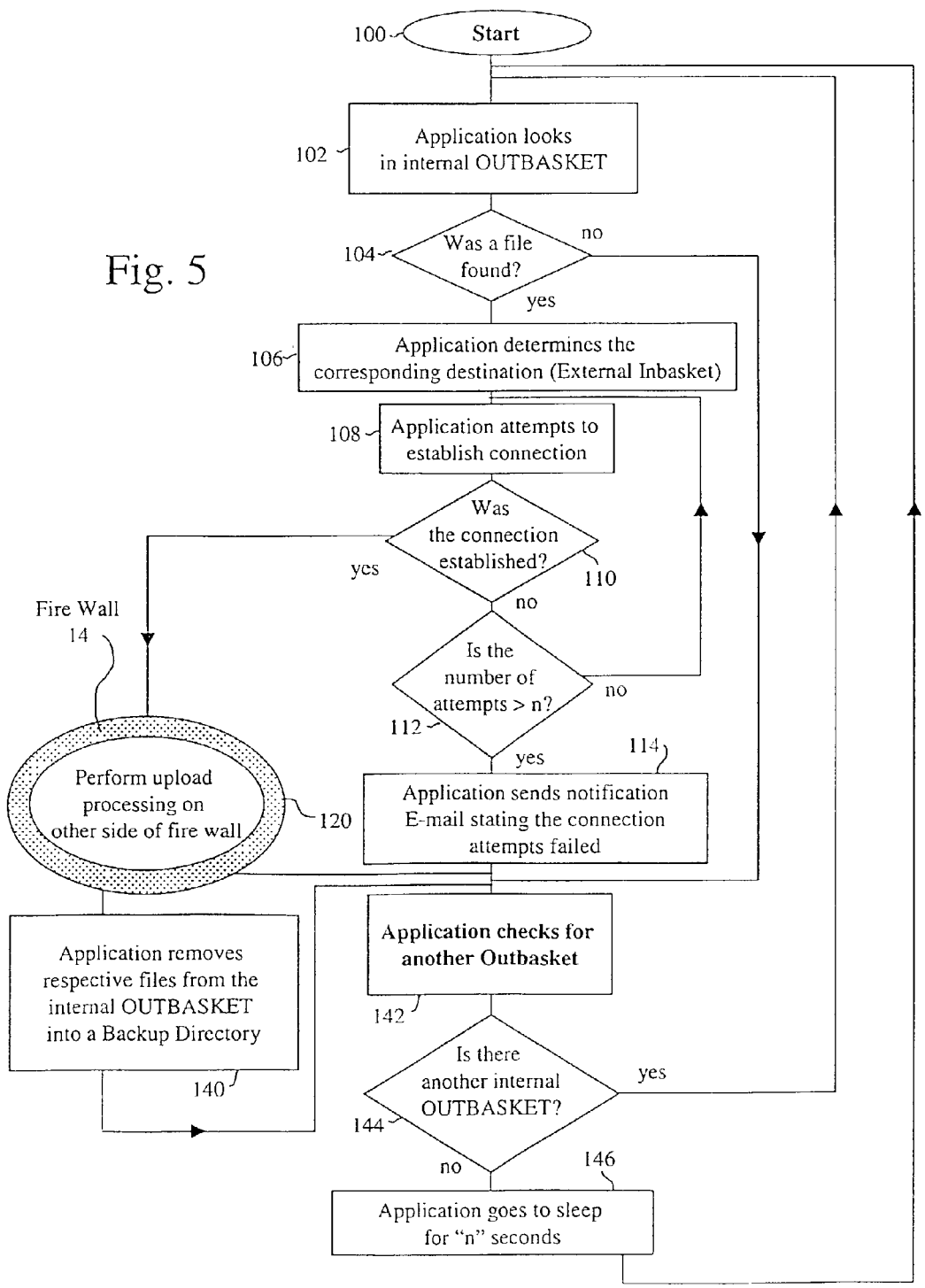
FIG. 5 is a flow chart showing an uploading process in accordance with one embodiment of the invention.

Hereinafter, further aspects of the uploading of files described above will be described with reference to FIG. 5. FIG. 5 is a flow chart showing the uploading process in accordance with one embodiment of the invention. The process will hereinafter be described with reference to the system shown in FIGS. 1–4. However, it is appreciated that the process of FIG. 5, as well as FIGS. 6–8, may be performed using another suitable system in accordance with a further embodiment of the invention.

As shown in FIG. 5, the process starts in step 100. Then, the process passes to step 102. In step 102, the application, i.e., the FTP processing portion 10 for example, looks in the outbaskets of the internal outbasket portion 40. Then, the process determines whether or not a file was found in step 104. For example, the control portion 30 or the network interface portion 20, which perform the process steps of FIG. 5 in accordance with one embodiment of the invention, might first check in the internal outbasket 42. It may be that no file was found in the internal outbasket 42. As a result, the process passes from step 104 to step 142. In step 142, the control portion 30 checks for another internal outbasket. Accordingly, a determination is then made in step 144 whether there is another internal outbasket. It may be that there is indeed another internal outbasket. For example, as shown in FIG. 2, another internal outbasket 44 is contained in the internal outbasket portion 40. As a result, the process passes from step 144 back to step 102 to check the newly identified outbasket. Then, in step 104, the control portion determines again whether a file was found in this newly identified internal outbasket 44. If yes, then the process passes to step 106. In step 106, the control portion determines a destination, i.e., an external inbasket, that corresponds to the particular internal outbasket 44. That is, such a destination may be an inbasket in the remote entity 80, i.e., the destination entity. Accordingly, in step 108, the control portion works in conjunction with the network interface portion 20 in an attempt to establish connection to the remote entity 80. Then, the process passes from step 108 to step 110. In step 110, a determination is made whether the connection was established. It may be that the network interface portion 20 was not successful in establishing a connection. As a result, the process passes from step 110 to step 112. In step 112, the control portion 30 determines how many attempts have been made to establish the connection to the remote entity 80. That is, a certain number of attempts are performed prior to performing any other action indicating that communication was not possible. The number of attempts "n" may be determined in any suitable manner. If the number of attempts is not greater than "n" then the control portion will try to establish communication an additional time. That is, the process passes from step 112 back to step 108.

Alternatively, it may be that the control portion 30 has indeed attempted to communicate with the remote entity 80 more than the threshold amount, i.e., more than "n" times. As a result, the process passes from step 112 to step 114. In step 114, the application sends notification to an appropriate person, component or file, for example, that the connection attempts have failed. Illustratively, this notification might be in the form of an e-mail. Further, the notification might be sent to the person who placed the file in the internal outbasket 44, as well as to an appropriate technical administrator, for example.

As shown in FIG. 5, it may be the situation that the connection was indeed established in step 110. As a result, the process passes from step 110 to step 120. In step 120, further processing is performed to transmit the file that is stored in the internal outbasket 44, in accordance with this illustrative example. The processing of step 120 is performed within a fire wall 14, as shown in FIG. 5. Such processing might be performed by the network interface portion 20. Further details of the processing of step 120 are described below with reference to the flowchart of FIG. 6. The processing of step 120 may result in a successful upload of a file from the FTP processing portion 10 to the remote entity FTP processing portion 82. Alternatively, the processing of step 120 may result in an unsuccessful upload.

If the processing of step 120 did indeed result in a successful upload, the process passes from step 120 to step 140. In step 140, the control portion 30 removes the file from the internal outbasket 44 and places that file into the backup directory 68, which is disposed in the memory portion 60 in the FTP processing portion 10. The file may then be stored in a backup directory 68 for some predetermined amount of time or indefinitely. Alternatively, it may be deemed that no backup file is necessary. As a result, subsequent to confirmation of a successful upload, the file may simply be deleted from the internal outbasket 44 by the control portion 30. After step 140, the process passes to step 142.

Alternatively, the processing of step 120 may not have resulted in a successful upload. As a result, the process passes from step 120 directly to step 142. In step 142, as is described above, the control portion 30 checks for another outbasket. Thereafter, further processing is performed as described above. The control portion 30 may again determine that there is another outbasket, i.e., the internal outbasket 46 as shown in FIG. 2, for example. As a result, the process will again pass from step 144 to step 102.

Alternatively, it may be the situation that there is not another internal outbasket in the internal outbasket portion 40. As a result, the process passes from step 144 to step 146. In step 146, the control portion 30 goes to sleep for a predetermined amount of time. In the period of time that the control portion 30 goes to sleep, a user may have placed a file in one of the internal outbaskets. After this predetermined amount of time, the process is again placed into motion, i.e., so as to transfer this additional file. That is, the process passes from step 146 to step 102. Further processing is continued as described above.

In the illustrative embodiment described above, the control portion works in conjunction with the network interface portion 20 in an attempt to establish connection to the remote entity 80. The specific nature of attempting to establish the connection, establishing the connection and confirming a connection may vary depending on the particular systems involved and what is agreed upon between the two or more communicating systems. For example, the network interface portion 20 may establish a connection with the destination entity 80 using an ACK/NAK (ACKnowledgement/Negative AcKnowledgement) code or technique. However, any suitable technique may be used so that the destination entity 80 might talk with the network interface portion 20, i.e., so as to effectively communicate data. Further, it is appreciated that in accordance with some embodiments of the invention, there may be no determination of whether a connection is established. That is, it may be the situation that a file in a particular internal outbasket in the FTP processing portion 10, for example, is blindly sent to a destination entity 80. This might be the case where the receipt of the file by the destination entity 80 is of low importance. Accordingly, varying degrees of determining successful communication may be used, i.e., depending on the particular circumstances.

Figure 6:
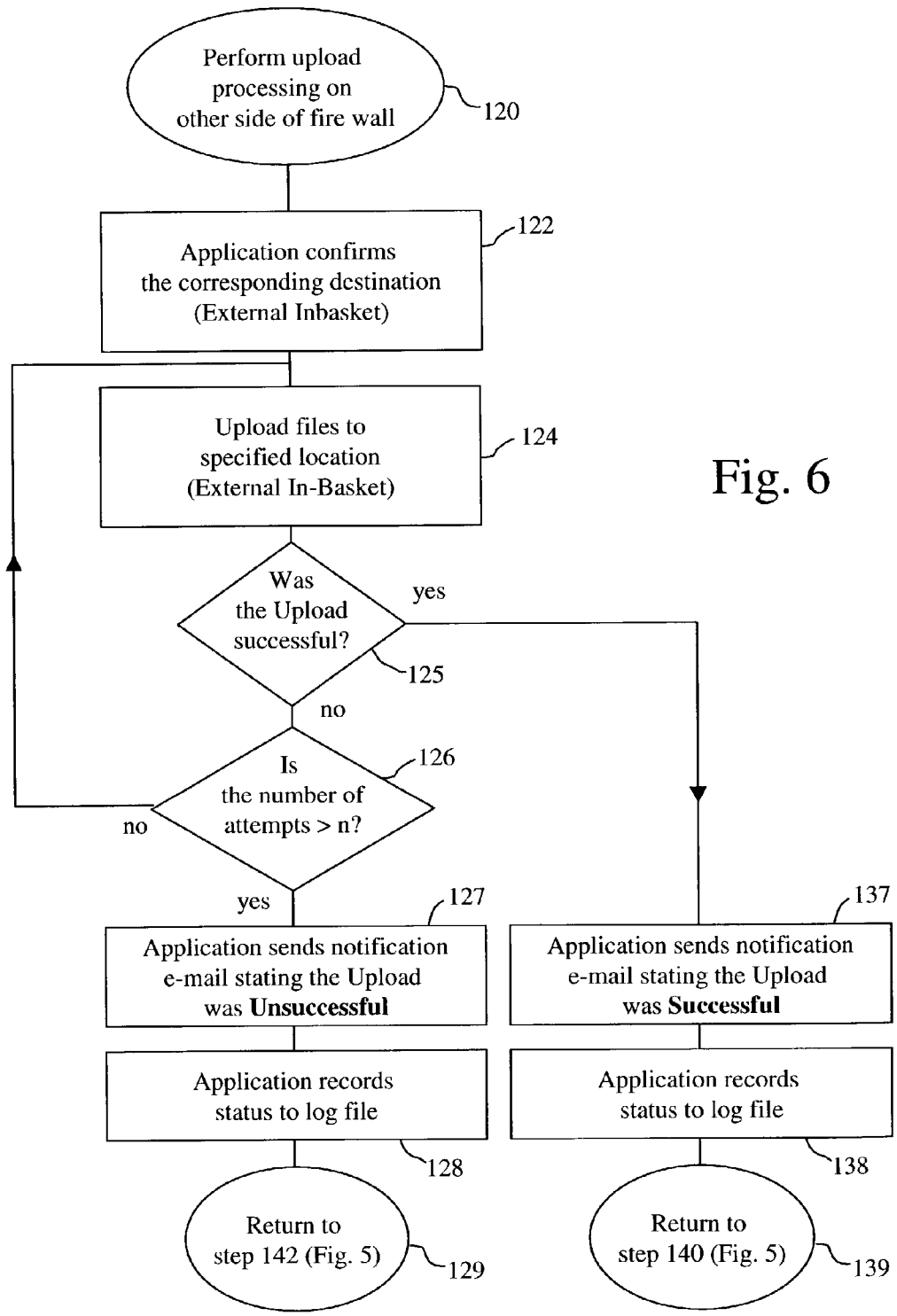
FIG. 6 is a flow chart showing in further detail the "perform upload processing on the other side of fire wall" step of FIG. 5 in accordance with one embodiment of the invention.

FIG. 6 is a flow chart showing in further detail the "perform upload processing on other side of the fire wall" step 120 of FIG. 5. As shown in FIG. 6, the subprocess starts in step 120 and passes to step 122. In step 122, the application, for example the network interface portion 30, confirms the corresponding destination. That is, the network interface portion 20 confirms the external inbasket that corresponds to the internal outbasket 44. For example, the external inbasket 87 in the remote entity FTP processing portion 82 may correspond to the internal outbasket 44.

After step 122, the process passes to step 124. In step 124, the network interface portion 20 uploads the file or files to the specified external inbasket. Then, the process passes from step 124 to step 125.

In step 125, the network interface portion 20 determines whether the upload was successful. This acknowledgment may be performed in any suitable manner, such as a suitable acknowledgement from the remote entity 80, for example.

It may be that the upload was not successful. As a result, the process passes to step 126. In step 126, the network interface portion 20 determines whether the number of attempts has exceeded the threshold number of attempts. That is, is the number of attempts greater than "n". If no, then the network interface portion 20 will perform further attempts in an effort to upload the file or files to the remote entity FTP processing portion 82 in the remote entity 80. That is, the process passes from step 126 back to step 124, as shown in FIG. 6.

Alternatively, it may be the situation that the threshold number of attempts has indeed been exceeded. As a result, the process passes from step 126 to step 127. In step 127, the network interface portion 20 in the FTP processing portion 10, for example, sends a notification e-mail stating that the upload was unsuccessful. However, it is appreciated that any suitable form of communication may be utilized to provide such status information to persons or components, for example, as is desired.

After step 127, the process passes to step 128. In step 128, the network interface portion 20 records the status to the log file 64, disposed in the memory portion 60. After step 128 as shown in FIG. 6, the process passes to step 129. In step 129, the process returns to step 142 as shown in FIG. 5. Thereafter, processing is performed as described above.

Alternatively, the process may determine in step 125 that the upload was successful. As a result, the process passes to step 137 in which a notification e-mail is sent indicating the successful upload. After step 137, the process passes to step 138. In step 138, the network interface portion 20 records the status to the log file 64, disposed in the memory portion 60. After step 138 as shown in FIG. 6, the process passes to step 139. In step 139, the process returns to step 140 as shown in FIG. 5. Thereafter, processing is performed as described above.

Accordingly, as described above, the FTP processing portion 10 performs an uploading of files. As noted above, an additional function performed by the system of the invention is the downloading of files. A user will download files when a user needs to retrieve a file from another location, i.e., such as the remote entity 80.

To perform such downloading, the user configures the system of the invention to indicate the locations where the files will be downloaded from. That is, the user configures the configuration parameters file 66 in the memory portion 60 to provide various associations between the various baskets. For example when uploading, a file that is placed in the internal outbasket 42 is transferred, based on the configuration information, to the external inbasket 87 in the remote entity FTP processing portion 82. In a similar manner when downloading or retrieving—a file that is placed in the external outbasket 85 in the remote entity FTP processing portion 82 may be configured for transfer to the internal inbasket 52, i.e., based on the configuration parameters that are stored in the configuration parameters file 66 in the FTP processing portion 10. That is, in accordance with one embodiment of the invention, the network interface portion 20 determines the source of a file upon receipt of a file. Based on the source, the network interface portion 20 places the file in an internal inbasket, i.e., based on the parameters in the configuration parameters file 66.

In accordance with one embodiment of the invention, at specified times or after a definite time interval (depending on the configuration), the application, i.e., the network interface portion 20 for example, attempts to connect to an FTP site outside of the user's location, i.e., the remote entity 80, to determine if files have been made available for download. If the connection fails, the application of the invention will retry after an "n" interval of time, for an "n" number of times. Between intervals the application looks for the next directory, i.e., the next basket. Illustratively, the network interface portion 20 might look in the external outbasket 85 in the remote entity FTP processing portion 82 to see if any files have been made available for downloading. If none, the network interface portion 20 may wait a period of time prior to trying another time. In this period of time, the network interface portion 20 might check to see if any files have been placed in the external outbasket 85', for example.

In accordance with one embodiment of the invention, if a connection is not established, after "n" attempts, the application will send a notification e-mail to the respective users. If connected and a file or files are found, the system of the invention downloads the file to a specified location or inbasket. A successful download will be recorded to a log file. In the event of an unsuccessful download an error e-mail alert will be sent.

Once the files are successfully placed in the user's internal inbasket, the sent files will then be removed from the outbasket at the external remote location, in which they were originally found. The files might then be placed in a designated "sent folder" at the remote location. However, such processing is controlled by the remote processor, i.e., the remote entity 80, for example.

Figure 7:
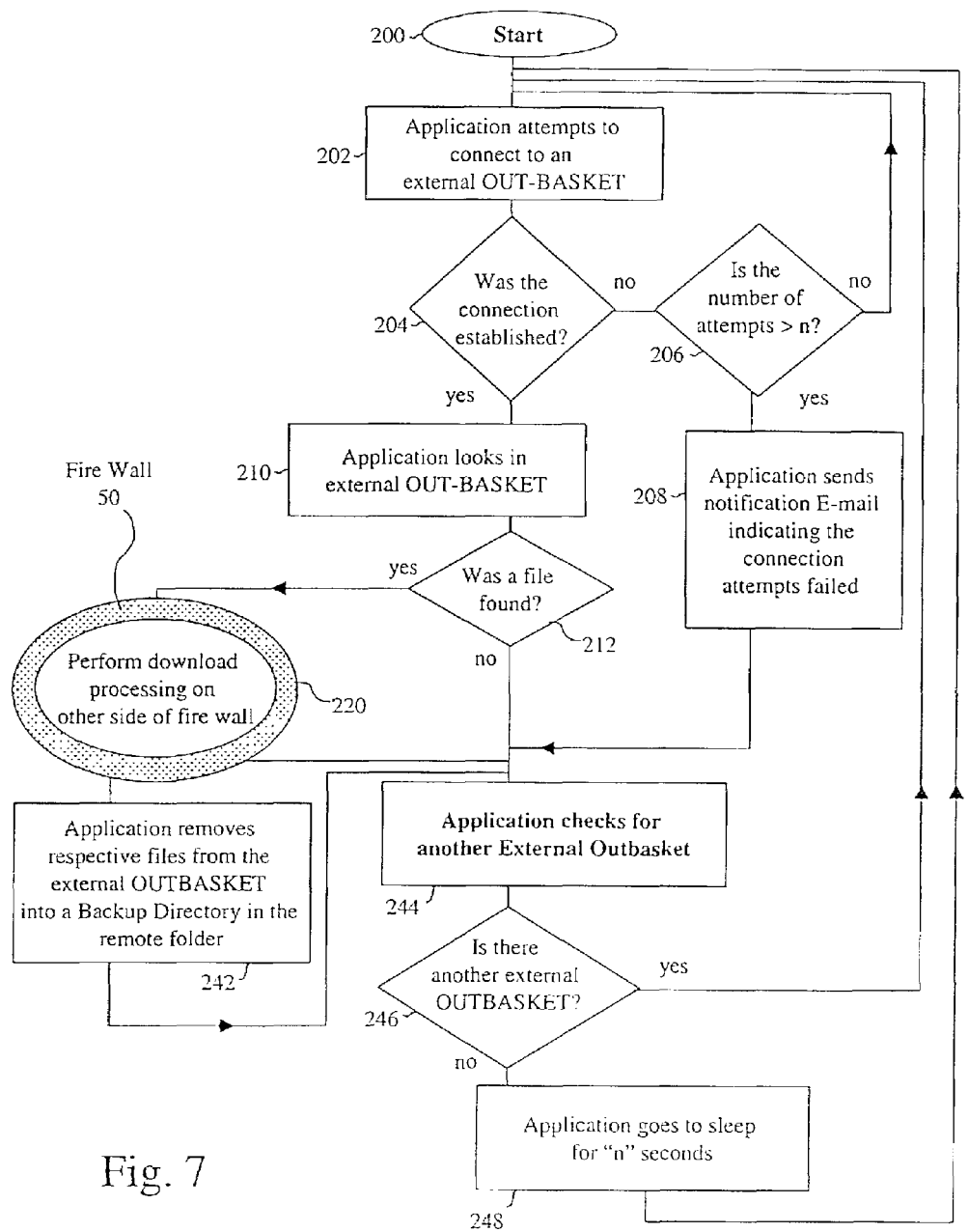
FIG. 7 is a flow chart showing a downloading process in accordance with one embodiment of the invention.

In further explanation, FIG. 7 is a flow chart showing a process for downloading in accordance with one embodiment of the invention. The illustrative downloading process of FIG. 7 starts in step 200. Then, the process passes to step 202. In step 202, the application, i.e., the network interface portion 20 in accordance with one embodiment of the invention, attempts to connect to an external outbasket. For example, the network interface portion 20 attempts to connect to the external outbasket 85 in the remote entity 80. Then, the process passes to step 204.

In step 204, the network interface portion 20 determines if the connection was established. If no, then the process passes to step 206. In step 206, the network interface portion 20 determines if the connection has been previously attempted a predetermined number of times so as to exceed a threshold "n". If no, then the process passes from step 206 to step 202. In step 202, the network interface portion 20 again attempts to connect to the external outbasket 85.

Alternatively, in step 206, the process may determine that the number of attempts does indeed exceed the threshold. As a result, the process passes from step 206 to step 208. In step 208, the control portion 30 sends a notification e-mail to an appropriate person or component indicating that the connection attempts failed. Then, the process proceeds to step 244, as is described further below.

As described above, the process determines in step 204 whether the connection was established. If the connection was established, i.e., "yes," then the process passes from step 204 to step 210. In step 210, the process looks in the external outbasket. Then, in step 212, the process determines whether a file was found in the external outbasket. If there was indeed a file found, then the process passes from step 212 to step 220. If no file is found, then the process passes to step 244. In accordance with one embodiment of the invention, the processing of step 220 is performed behind a fire wall, as may be desired. Further details of the processing of step 220 are described below.

In step 220, it may be the situation that the download was indeed successful. If the download was successful, then the process passes from step 220 to step 242. In step 242, the remote application removes the respective files from the outbasket into a backup directory in a remote folder, i.e., in the destination entity 80, for example. Then, the process passes from step 242 to step 244. Alternatively, the processing of step 220 may determine that the download was not successful. As a result, the process passes from step 220 directly to step 244.

In step 244, the network interface portion 20 checks for another outbasket in the remote entity FTP processing portion 82. Then, in step 246, a determination is made whether there is indeed another outbasket. If yes, the process passes from step 246 back to step 202. Further processing is performed as described above.

Alternatively, the process may determine in step 246 that there is not another outbasket. As a result, the process passes from step 246 to step 248. In step 248, the application goes to sleep for "n" seconds. Accordingly, after some predetermined amount of time, the process is again put into motion. That is, the process passes from step 248 back to step 202. Further processing is performed again as described above. That is, over the duration of the sleep time, a user at the remote location may have placed a file (for transfer) in one of the external outbaskets (85). After the sleep time, that file will be transferred from the remote entity FTP processing portion 82 to the FTP processing portion 10.

Figure 8:
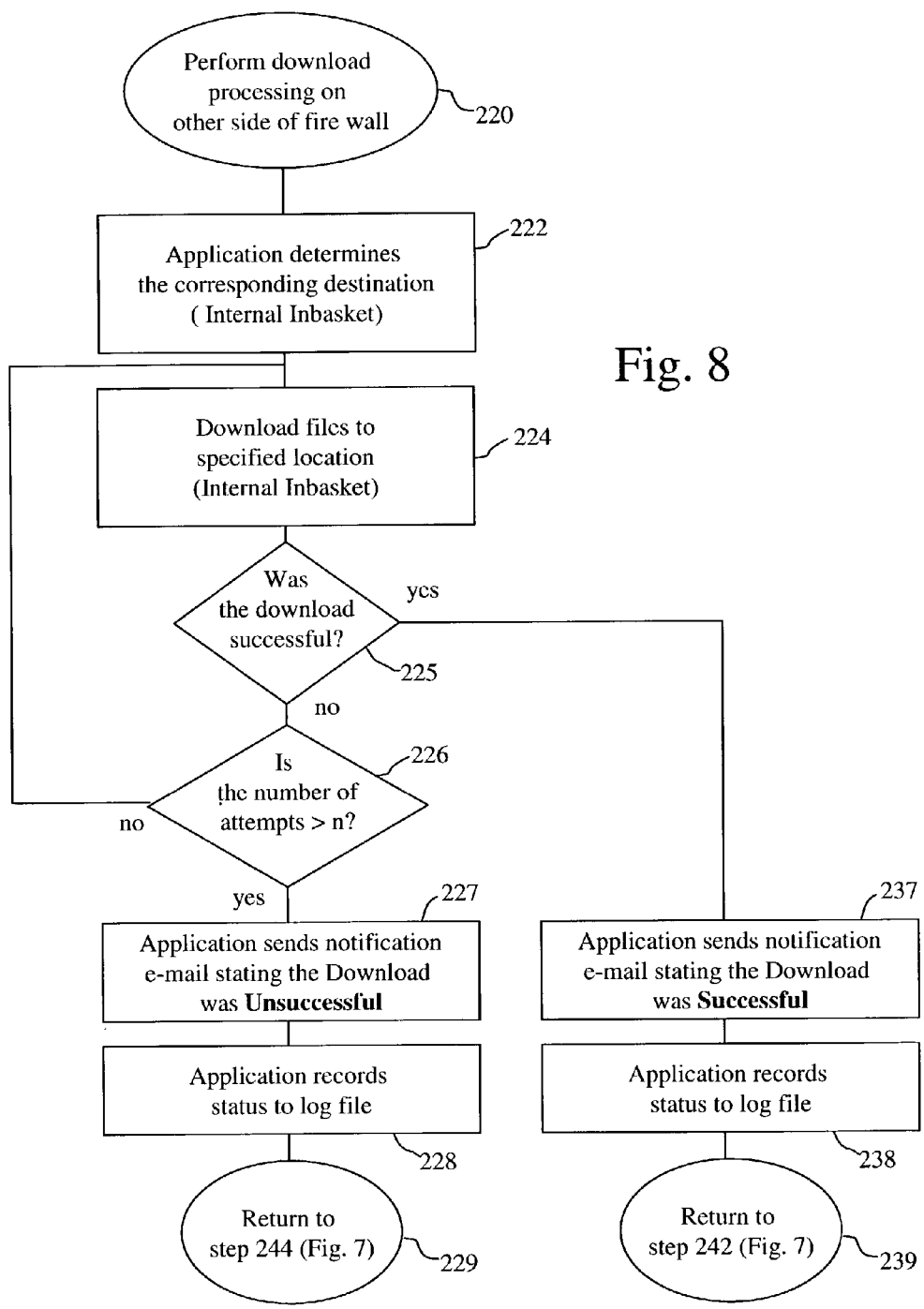
FIG. 8 is a flow chart showing in further detail the "perform download processing on the other side of fire wall" step of FIG. 7 in accordance with one embodiment of the invention.

FIG. 8 is a flow chart showing in further detail the "downloading processing performed on the other side of the fire wall" step 220 of FIG. 7. As shown in FIG. 8, the process starts in step 220. Then, the process passes to step 222. In step 222, the application determines the corresponding destination of the file, i.e., the internal inbasket 52, for example, in the internal inbasket portion 50. Then, the process passes to step 224. In step 224, the process downloads the files from the remote "external outbasket" to the specified internal inbasket 52. Then, the process passes from step 224 to step 225. In step 225, the process determines whether the download was successful. If no, then the process passes to step 226. The process then determines whether a threshold number of attempts have been performed. If no, then the process returns to step 224.

Alternatively, the threshold number of attempts may have been exceeded as determined in step 226. As a result, the process passes from step 226 to step 227. In step 227, the application sends a notification stating that the download was unsuccessful. Illustratively, this notification may be in the form of an e-mail to an appropriate person or persons. Then, the process passes to step 228. In step 228, the application, i.e., the network interface portion 20 for example, records the status to the event log 64, which is in the memory portion 60 of the FITP processing portion 10. Then, the process passes to step 229. In step 229, the process returns to step 244, as shown in FIG. 7.

The process may have determined that the download was indeed successful in step 225. As a result, the process passes to step 237. In step 237, the application sends a notification e-mail stating that the download was successful. Then, the process passes to step 238. In step 238, the application records the status to the event log 64. Then, the process passes to step 239. In step 239, the process returns to step 242 of FIG. 7. Further processing is performed as described above.

As described herein, a file may be placed in an internal outbasket for sending, or alternatively, in an internal inbasket after being received by the FTP processing portion 10. When a file is placed into an internal outbasket or an internal inbasket, a suitable monitoring program will determine a new file has arrived into the internal outbasket or internal inbasket. This determination might be performed in any suitable manner such as using an alert or by periodic checking, for example. Illustratively, the monitoring program might be contained in the control portion 30. The monitoring program executes a set of instructions based on the particular inbasket or outbasket into which the file was placed. The set of instructions for the various inbaskets, and various outbaskets, might well be different, as desired. The instructions might be stored in the configuration parameters file 66, for example.

For example, the monitoring program may determine that a new file has arrived into the internal inbasket 54, but the monitoring program has been configured such that the monitoring program must wait until after 6:00 p.m. before processing the file, i.e., to reduce workload on other systems that need to operate during the day. Another example may be that the monitoring program detects a new file has arrived and may send a message to an accounting system, which charges a predetermined account based on activity. This charge, for example, might be performed regardless of content or successful transmission.

Accordingly, once a file is received in either an internal outbasket or internal inbasket (in the FTP processing portion 10), a predetermined process is implemented on that file so as to process the file in some predetermined manner. This processing, i.e., execution of instructions, might be performed by a monitoring program in the control portion 30, as noted above. However, the set of instructions regarding what to do with a file, placed in a internal outbasket or internal inbasket, might be contained in another component, such as in the respective internal outbasket portion 40 or internal inbasket portion 50, for example.

The system of the invention may be in the form of a multi-threaded application. As a result multiple instances of the application may simultaneously perform the processing as described above. For example, the application, including the FTP processing portion 10, might allow up to four instances of the application to run simultaneously. This, allows the application to perform file transfers with up to four sites at any one time, or alternatively, transfer four files to the same site at one time, for example. Accordingly, the multiple instances might share a load, for a particular internal outbasket, or alternatively, service separate internal outbaskets, for example. However, the distribution of the load may be determined in any suitable manner. The multiple instances of the application may utilize any suitable technique, such as time slicing techniques.

As previously mentioned, the process of the invention is configurable. In other words, it is appreciated that the software used in the practice of the invention is configurable. To further explain, users are provided with access to the configuration parameters file 66. The configuration parameters file 66 might be in the form of an "ini.file" or INItialization file, for example. This configuration file allows the user to add inbaskets and outbaskets, as well as to alter a variety of other operating parameters or information. That is, each internal inbasket and internal outbasket will have a set of associated properties, in accordance with one embodiment of the invention. That is, the user has the ability to set a variety of control parameters. Illustratively, these control parameters might include the name of the basket, host, Port, userid, password, timeout-period, type-of-transfer (binary or ascii), local-source-directory, remote-destination-directory, polling-interval, continuous-polling or time-driven, and the sent folder, as well as other operational parameters. The "PORT" parameter is the TCP/IP communications port the software or program of the invention uses to send data along. In accordance with one embodiment of the invention, the user may specify any port they wish, as well as vary the other parameters.

As described above, each internal inbasket and internal outbasket may be provided with a set of associated properties. However, it is appreciated that some of these parameters might be grouped together or in fact changed globally for a particular user. For example, a user might desire that the same time-out period be used for all of that user's outbaskets. Accordingly, the system may be provided with the capability to globally set that user's time-out period. Further, default settings may be utilized as is desired.

Such variables are freely configurable in accordance with one embodiment of the invention. For example, the user may want to create an internal outbasket, i.e., for files going out of the user's system. Further, the user may want to create an internal inbasket, i.e., for retrieved files that are coming into the user's system from a particular entity. In the creation of these baskets, the user will be able to name the basket, specify the remote parameters, specify the polling type, intervals and other FTP parameters, for example.

Further details, in accordance with one embodiment of the invention, will hereinafter be described with reference to Table 1. Table 1 provides a list of various parameters that may be used in sending/receiving files in one embodiment of the method of the invention, as well as a description of those parameters.

TABLE 1

| PARAMETER | DESCRIPTION |
| --- | --- |
| NAME | The name of the destination site. |
| HOST | The actual host name that is used by the program such as: ftp.company_x.com. |
| PORT | The data transmission port, for example port 21. |
| USERID | User ID to connect to the destination server. |
| PASSWORD | Password for the destination server. |
| TIMEOUT-PERIOD | How long the software will wait for a response from the system being connecting to. |
| TYPE-OF-TRANSFER (BINARY or ASCII) | Advanced parameter providing data type. |
| LOCAL-SOURCE-DIRECTORY | Where the software will pick up files from. |

TABLE 1-continued

| PARAMETER | DESCRIPTION |
| --- | --- |
| | (Internal Outbasket). |
| REMOTE-DESTINATION-DIRECTORY | Where the files will be placed at the destination. (External Inbasket). |
| POLLING-INTERVAL | How frequently the software will check for new files to send. |
| CONTINUOUS-POLLING or TIME-DRIVEN | Whether software is always checking for new files to send or only at certain times |
| SENT FOLDER | Directory in which to place copies of files that have been sent. |

As an example showing utilization of some of the above parameters, it might be that a user wants to send data to a server at "Company_c" called FTP.COMPANY_C_FTPSERVER.COM, using PORT 21 with a login user identification of "customer" and a password of "foxtrot." Further, the user wants the files show up in the "COMPANY_C_INCOMING" directory. Accordingly, the parameters would look like:

TABLE 2

| PARAMETERS |
| --- |
| NAME = COMPANY_C |
| HOST = FTP.COMPANY_C_FTPSERVER.COM |
| USERID = customer |
| PASSWORD = foxtrot |
| REMOTE-DESTINATION-DIR = COMPANY_C_INCOMING |

It is to be appreciated that more parameters might be used than those set forth in Table 2 for this illustrative example. Further, as noted above, it should be appreciated that some parameters might automatically be set at some default value, as may be desired.

In accordance with a further aspect of the invention, each basket is associated with a set of e-mail parameters. Such e-mail parameters might include a mailing list, which will specify the list of users that would be notified of successful transfers and in the event of failures. Further e-mail parameters might include a "subject" for sent e-mails, as well as parameters controlling header and footer messages that are added to the system generated messages.

In accordance with one embodiment of the invention, a system-generated message might include the name of the basket, the name of the files that were transferred, the size of the file that was transferred, the time of transfer, and/or if the transfer was successful, for example.

Further, the system of the invention will maintain an event log file and a dump file, as noted above. The event LOG file will be used to store messages displayed and generated by the application, that could be of use in trouble shooting, back-tracking, auditing, etc., for example. The system of the invention also creates a dump file (DMP file), as illustratively shown in FIG. 3. The dump file might be in the form of a comma data file. The DMP file will contain a dump of all files that were transferred using the application. Some of the fields that may preferably be present in the DMP file include the Date (mm/dd/yyyy), the Time (hh:mm:ss:xx, where xx is milliseconds), the File Name, the File Size, the time taken to finish the transfer, the Source Basket Name, the Destination Basket Name, and if the transfer was not successful, an ERROR message, for example. It is of course appreciated that any other parameters might also be included in the dump file, as is desired.

As described above, a file that is placed in a particular internal outbasket 42 in the FTP processing portion 10 is transferred to a particular external inbasket 87 based on the configuration parameters, which are stored in the configuration parameters file 66 in the FTP processing portion 10. However, it is appreciated that a file in the internal outbasket 42, for example, may not only be transferred to one external inbasket. That is, the system may be configured such that the placement of a file in the internal outbasket 42 by a user, for example, results in the FTP transfer of the file to two (2) or more external inbaskets, for example, i.e., such as multiple external inbaskets in the external inbasket portion 86.

Further, it is appreciated that the placement of a file in a particular internal outbasket 42, in the FTP processing portion 10, for example, might result in the file being transferred by the network interface portion 20 to a remote system, and not to any particular external inbasket in such remote system. That is, the configuration parameters in the configuration parameters file 66 may not specify that a file, placed in a particular internal outbasket in the internal outbasket portion 40, is to be placed specifically in a particular external inbasket in the remote entity FTP processing portion 82. The remote entity FTP processing portion 82 may in fact have only one external inbasket. Rather, the configuration parameters in the configuration parameters file 66 may only specify the destination entity FTP processing portion 82 as the recipient of the file.

As described above, the network interface portion 20 might look in the external outbasket 85, in the remote entity FTP processing portion 82, to see if any files have been made available for downloading. In accordance with a further embodiment of the invention, notice could be sent to indicate new files in an outbasket, either in an internal outbasket or an external outbasket. That is, for example, if a new file were placed in the external outbasket 85, then the remote entity FTP processing portion 82 would forward a suitable e-mail to the network interface portion 20. The e-mail would alert the network interface portion 20 that it should check the external outbasket 85, in the remote entity 80, for a file.

As described above, FIGS. 1–4 show one embodiment of the system of the invention. Further, FIGS. 5–8 show various steps of one embodiment of the method of the invention. The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. Accordingly, files placed in the internal outbaskets in the FTP processing portion 10 might be encrypted in accordance with one embodiment of the invention using a suitable technique. An encryption module might be used to encrypt the data in the files before the files are FTP'd. Further, files that are received in the internal inbasket may be encrypted, i.e., so as to require decryption using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine that is used to implement the invention, i.e., to allow a user to interface with the FTP processing portion 10, for example. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method of transferring files using file transfer protocol (FTP) from a first memory associated with a first processing portion to a second processing portion, the method comprising:

placing a file in the first memory;

determining a destination of the file based on configuration parameters associated with the first memory, the destination of the file being the second processing portion; and attempting to establish a connection between the first processing portion and the second processing portion in order to transfer the file from the first memory to the second processing portion;

wherein the first processing portion includes a second memory into which a second file is placed for transferring using FTP, the method further including:

implementing a first set of instructions as a result of placing the file in the first memory, the first set of instructions identifying the second processing portion as the destination, the first set of instructions and the first memory associated with and, for sending to, only a single destination, which is the second processing portion; and implementing a second set of instructions as a result of placing the second file in the second memory, the first set of instructions being different than the second set of instructions, the second set of instructions identifying a further processing portion as the destination, the further processing portion being different than the second processing portion; the second set of instructions and the second memory associated with, and for sending to, only a single destination, which is the further processing portion.

2. The method of claim 1, further including the steps of:

determining that the connection between the first processing portion and the second processing portion is successful;

retrieving the file from the first memory; and transferring the file to the second processing portion.

3. The method of claim 2, further comprising the steps of:

determining that the file transfer from the first processing portion and the second processing portion is successful; and providing notification that the file transfer attempts were successful.

4. The method of claim 3, further including recording the status of the successful file transfer to a log file.

5. The method of claim 3, further including the step of removing the file from the first memory and placing the file into a backup directory.

6. The method of claim 3, wherein the process further includes sending a notification e-mail that the file transfer was successful.

7. The method of claim 1, wherein the second processing portion includes a third memory.

8. The method of claim 7, wherein the first memory is an internal outbasket disposed in a home FTP processing portion and the third memory is an external inbasket disposed in a remote entity FTP processing portion.

9. The method of claim 7, wherein the first memory is an external outbasket disposed in a remote FTP processing portion and the third memory is an internal inbasket disposed in a home FTP processing portion.

10. The method of claim 1, wherein the determining the destination of the file based on configuration parameters associated with the first memory is performed by retrieving information from a configuration parameters file.

11. The method of claim 10, wherein the configuration parameters file is an INI file.

12. The method of claim 10, wherein the configuration parameters include at least one of the name of an external inbasket, timeout-period between attempts, local-source-directory, remote-destination-directory, and polling-interval.

13. The method of claim 1, wherein determining the destination of the file based on configuration parameters associated with the first memory includes the second processing portion determining the destination of the file upon receipt of the file from the first processing portion.

14. The method of claim 1, wherein the configuration parameters are stored in the first processing portion.

15. The method of claim 1, wherein the configuration parameters are stored in the second processing portion, the configuration parameters associating the first memory in the first processing portion with a third memory in the second processing portion.

16. The method of claim 1, wherein determining the destination of the file based on configuration parameters associated with the first memory includes determining at least two destinations of the file based on placement of the file in the first memory.

17. The method of claim 1, wherein the configuration parameters result in the file being transferred to a designated inbasket in the second processing portion.

18. A method of transferring files using file transfer protocol (FTP) from a first memory associated with a first processing portion to a second processing portion, the method comprising:
    placing a file in the first memory;
    determining a destination of the file based on configuration parameters associated with the first memory, the destination of the file being the second processing portion; and
    attempting to establish a connection between the first processing portion and the second processing portion in order to transfer the file from the first memory to the second processing portion;
    the method further including the steps of:
    determining that the connection between the first processing portion and the second processing portion is successful;
    retrieving the file from the first memory; and
    transferring the file to the second processing portion; and
    the method further comprising the steps of:
    determining that a file transfer from the first processing portion to the second processing portion is not successful;
    determining if a threshold number of attempts for file transfer has been exceeded;
        if a threshold number of attempts for file transfer has not been exceeded, then attempting again to transfer the file from the first processing portion to the second processing portion; and
        if a threshold number of attempts for file transfer has been exceeded, then terminating the attempts and providing notification that the file transfer attempts were unsuccessful; and
    wherein the determining the destination of the file based on configuration parameters associated with the first memory includes implementing a first set of instructions as a result of placing the file in the first memory, the first set of instructions identifying the second processing portion as the destination, the first set of instructions and the first memory associated with and, for sending to, only a single destination, which is the second processing portion; and
    determining a destination of a further file, based on configuration parameters associated with a second memory in which the further file is placed, including implementing a second set of instructions as a result of placing the second file in the second memory, the first set of instructions being different than the second set of instructions, the second, set of instructions identifying a further processing portion as the destination, the further processing portion being different than the second processing portion; the second set of instructions and the second memory associated with, and for sending to, only a single destination, which is the further processing portion, the first processing portion including the second memory.

19. The method of claim 18, further including recording the status of the unsuccessful file transfer to a log file.

20. A method of transferring files using file transfer protocol (FTP) from a first memory associated with a first processing portion to a second processing portion, the method comprising:
    placing a file in the first memory;
    determining a destination of the file based on configuration parameters associated with the first memory, the destination of the file being the second processing portion; and
    attempting to establish a connection between the first processing portion and the second processing portion in order to transfer the file from the first memory to the second processing portion;
    the method further comprising the steps of:
    determining that the connection between the first processing portion and the second processing portion is not successful;
    determining if a threshold number of attempts for connection has been exceeded:
        if a threshold number of attempts for connection has not been exceeded, then attempting again to establish a connection between the first processing portion and the second processing portion; and
        if a threshold number of attempts for connection has been exceeded, then providing notification that the connection attempts failed; and
    wherein the determining the destination of the file based on configuration parameters associated with the first memory includes implementing a first set of instructions as a result of placing the file in the first memory, the first set of instructions identifying the second processing portion as the destination, the first set of instructions and the first memory associated with and, for sending to, only a single destination, which is the second processing portion; and
    determining a destination of a further file, based on configuration parameters associated with a second memory in which the further file is placed, including implementing a second set of instructions as a result of placing the second file in the second memory, the first set of instructions being different than the second set of instructions, the second set of instructions identifying a further processing portion as the destination, the further processing portion being different than the second processing portion; the second set of instructions and the second memory associated with, and for sending to, only a single destination, which is the further processing portion, the first processing portion including the second memory.

21. The method of claim 20, wherein the notification that the connection attempts failed is in the form of an e-mail.

22. The method of claim 20, wherein the first memory is an internal outbasket; and the process further includes checking another internal outbasket between attempts to establish a connection between the first processing portion and the second processing portion.

23. A method of transferring files using file transfer protocol (FTP) from a first memory associated with a first processing portion to a second processing portion, the method comprising:

placing a file in the first memory;

determining a destination of the file based on configuration parameters associated with the first memory, the destination of the file being the second processing portion; and attempting to establish a connection between the first processing portion and the second processing portion in order to transfer the file from the first memory to the second processing portion; and wherein the configuration parameters result in the file being transferred to at least one of a first designated inbasket in the second processing portion and a second designated inbasket in the second processing portion; and the second processing portion implementing a first set of instructions if the file is placed in the first designated inbasket; and the second processing portion implementing a second set of instructions if the file is placed in the second designated inbasket, the first set of instructions being different than the second set of instructions; and wherein the determining the destination of the file based on configuration parameters associated with the first memory includes implementing a first set of instructions as a result of placing the file in the first memory, the first set of instructions identifying the second processing portion as the destination, the third set of instructions and the first memory associated with and, for sending to, only a single destination, which is the second processing portion; and determining a destination of a further file, based on configuration parameters associated with a second memory in which the further file is placed, including implementing a second set of instructions as a result of placing the second file in the second memory, the first set of instructions being different than the second set of instructions, the second set of instructions identifying a further processing portion as the destination, the further processing portion being different than the second processing portion; the second set of instructions and the second memory associated with, and for sending to, only a single destination, which is the further processing portion, the first processing portion including the second memory.

* * * * *